(12) United States Patent
Hult et al.

(10) Patent No.: US 9,074,727 B2
(45) Date of Patent: Jul. 7, 2015

(54) SAFETY GUARD FOR A ROTATABLE MEMBER

(71) Applicant: OIL LIFT TECHNOLOGY, INC., Calgary (CA)

(72) Inventors: Vern Hult, Calgary (CA); Anne Steghaus, Calgary (CA); Scott Rutherford, Calgary (CA); Kevin Harty, Calgary (CA); Max Romansky, Calgary (CA)

(73) Assignee: OIL LIFT TECHNOLOGY, INC., Calgary (CA)

( * ) Notice: Subject to any disclaimer, the term of this patent is extended or adjusted under 35 U.S.C. 154(b) by 0 days.

(21) Appl. No.: 13/950,136

(22) Filed: Jul. 24, 2013

(65) Prior Publication Data

US 2014/0031135 A1    Jan. 30, 2014

Related U.S. Application Data

(60) Provisional application No. 61/675,212, filed on Jul. 24, 2012.

(51) Int. Cl.
 *E21B 43/00* (2006.01)
 *F16P 1/02* (2006.01)
 *F16P 1/04* (2006.01)

(52) U.S. Cl.
 CPC .... *F16P 1/02* (2013.01); *F16P 1/04* (2013.01)

(58) Field of Classification Search
 USPC ............... 464/170, 178; 166/68.5, 67, 68, 72; 74/609
 See application file for complete search history.

(56) References Cited

U.S. PATENT DOCUMENTS

| 1,289,375 | A | * | 12/1918 | Bright ...................... 464/178 X |
| 4,185,474 | A | * | 1/1980 | Kulischenko ............. 464/178 X |
| 5,653,290 | A | | 8/1997 | Bland |
| 7,874,369 | B2 | * | 1/2011 | Parker et al. ............. 166/68.5 X |
| 2011/0266005 | A1 | | 11/2011 | Hult et al. |

FOREIGN PATENT DOCUMENTS

DE        532 052    *  8/1931    ............. 464/177

OTHER PUBLICATIONS

International Search Report and Written Opinion of the International Search Authority—corresponding PCT application PCT/CA2013/050576.

* cited by examiner

*Primary Examiner* — Gregory Binda
(74) *Attorney, Agent, or Firm* — Goodwin Law; Linda M. Thompson (57) ABSTRACT

Embodiments of a safety guard, fit concentrically over a rotating member, such as a rod assembly, which extends outwardly from apparatus, such as a drive head. The guard may be restrained during normal operation for preventing entanglement of personnel or other apparatus with the rod assembly which continues to rotate within the tubular guard, or may be unrestrained during normal operation. When unrestrained, the guard is free to co-rotate with the rod assembly, but has a low moment of inertia such that the guard decelerates rapidly when restrained so as to prevent entanglement. An anti-friction interface between the guard and the rod assembly is formed by the material of manufacture of the guard itself or by bearings or bushings supported in an annulus between the guard and the rod assembly.

11 Claims, 13 Drawing Sheets

Fig. 1C

Fig. 1D Section A-A

Section A-A

SAFETY GUARD FOR A ROTATABLE MEMBER

CROSS-REFERENCE TO RELATED APPLICATIONS

This application is a regular application claiming priority of U.S. provisional application 61/675,212, filed Jul. 24, 2012, the entirety of which is incorporated herein by reference.

FIELD OF THE DISCLOSURE

Embodiments of the disclosure relate to safety equipment to prevent entanglement with a moveable element, such as a rotatable driven member, and more particularly, to safety apparatus for preventing injury resulting from contact with a rotating, driven rod extending outwardly from a drive head.

BACKGROUND

It is well known that there are many safety concerns when working in the vicinity of moving equipment, particularly in industries such as the oil and gas industry. Precautions are taken to ensure that personnel working with, or near such equipment are protected from directly engaging and becoming entangled in the moving apparatus. Guards are placed over the moving parts.

In the case of progressing cavity pumps, a polished or coiled rod is connected to a main shaft of a drive head at surface, for rotating a rod string and rotor connected thereto, for driving the pump downhole. The rotatable rod typically extends above a rod clamp on the drive head at surface. The rod rotates with the driven main shaft.

It is known to provide a fixed safety guard to surround or enclose the exposed portion of a polished rod. Thus, the guard prevents accidental engagement with a rotating polished rod. The energy in the rotating polish rod and supported drive string is significant and rotation takes some time to arrest. Thus, by preventing contact with the rod string, injury to personnel and damage to the surface of the polished rod is minimized.

Tubular, fixed guards are known. Typically, the guard is a metal mesh or solid plastic tube which has a fixed diameter that is significantly larger than both the main shaft and the polished rod clamp to avoid engaging either the shaft or the rod during rotation. The prior art guards are affixed to the drive head, such as to a top of the gearbox and remain stationary. In drive heads where the motor is affixed to the top of the gearbox, the motor must be spaced sufficiently from the main shaft and polished rod clamp to permit mounting the guard therebetween. This may result in a larger drive head than would otherwise be required or prevent proper installation of the guard at all. Further, fixed guards must typically be custom-made for the drive head to enable affixing thereto.

There is interest in the industry for a universal safety means to prevent or minimize contact with polished rod, main shaft and polished rod clamp while maximizing space in the drive head for mounting the motor and the like.

SUMMARY

Embodiments of a safety guard and system disclosed herein comprise a tubular guard which is supported concentrically over a driven member and substantially prevents injury to personnel and equipment by preventing entanglement with the driven member.

In embodiments, the guard is restrained during normal operation. An anti-friction interface formed within an annulus between the guard and the driven member enables differential rotation therebetween.

In embodiments where the guard is unrestrained during normal operation, the guard is free to co-rotate with the driven member. The guard has a moment of inertia such that when restrained the guard slips to decelerate rapidly enabling the driven member to rotate within the guard. The rapid deceleration minimizes contact injury or secondary entanglement with the co-rotating guard as it slips and even slows to a stop. The anti-friction interface formed within an annulus between the guard and the driven member enables this differential rotation therebetween when the guard is restrained. In the case of a rotating polished rod or coiled rod, the guard is fit about the rod extending from apparatus such as a drive head or rod string. The guard is fit to the driven member regardless of the size, make or configuration of the drive head.

In a broad aspect, a safety guard for preventing entanglement by contact with a rotatable driven member comprises a tubular guard positioned concentrically about the driven member and forming an annulus therebetween. An anti-friction interface is formed within the annulus for enabling differential rotation between the guard and the driven member, if and when the guard is restrained.

In embodiments, the guard is restrained from rotation during normal operations. In other embodiments the guard is unrestrained in normal operations is free to co-rotate with the driven member. The guard has a low moment of inertia, so that when restrained by contact therewith, rotation of the guard decelerates while the driven member continues to rotate therein.

Embodiments are particularly suitable for use with oilfield equipment such as a rotating rod assembly which extends outwardly from a drive head, the rotating rod assembly driving a downhole pump.

In another broad aspect, a system for preventing entanglement by contact with a rotating rod assembly for driving a downhole pump, comprises a drive head having a housing from which the rotating rod assembly extends. A tubular guard is positioned concentrically about at least the rotating rod assembly and forms an annulus therebetween. An anti-friction interface is formed within the annulus for enabling differential rotation between the guard and the rotating rod assembly.

In embodiments, the guard is restrained from rotation during normal operations.

In other embodiments, the guard is unrestrained in normal operations and is free to co-rotate with the driven member. The guard has a low moment of inertia. When restrained by contact therewith, rotation of the guard decelerates while the driven member continues to rotate therein.

In an embodiment the rod assembly comprises a rotating rod and a rod clamp for operatively connecting the rotating rod to a main driven shaft extending upwardly from the housing and being rotatable therewith. A drive is operatively connected to the main shaft for driving the pump. The drive extends upwardly from the housing adjacent to the rod assembly.

BRIEF DESCRIPTION OF THE DRAWINGS

FIG. 8 is a detailed cross-sectional view of the safety guard according to FIG. 1A illustrating co-rotation between the safety guard and the driven rotatable member;

DETAILED DESCRIPTION

Having reference to FIGS. 1A to 6D, in embodiments described herein, tubular safety guards 10 are positioning concentrically about a driven, rotatable member 12, extending outwardly from apparatus 14. The guard 10 is supported by the driven member 12 spaced from the apparatus 14. An anti-friction interface F is formed in an annulus 16 between the rotatable member 12 and the guard 10. Being supported by the driven member 12, the guard 10 is independent of the apparatus 14.

Figures 8A, 8B, 8C:
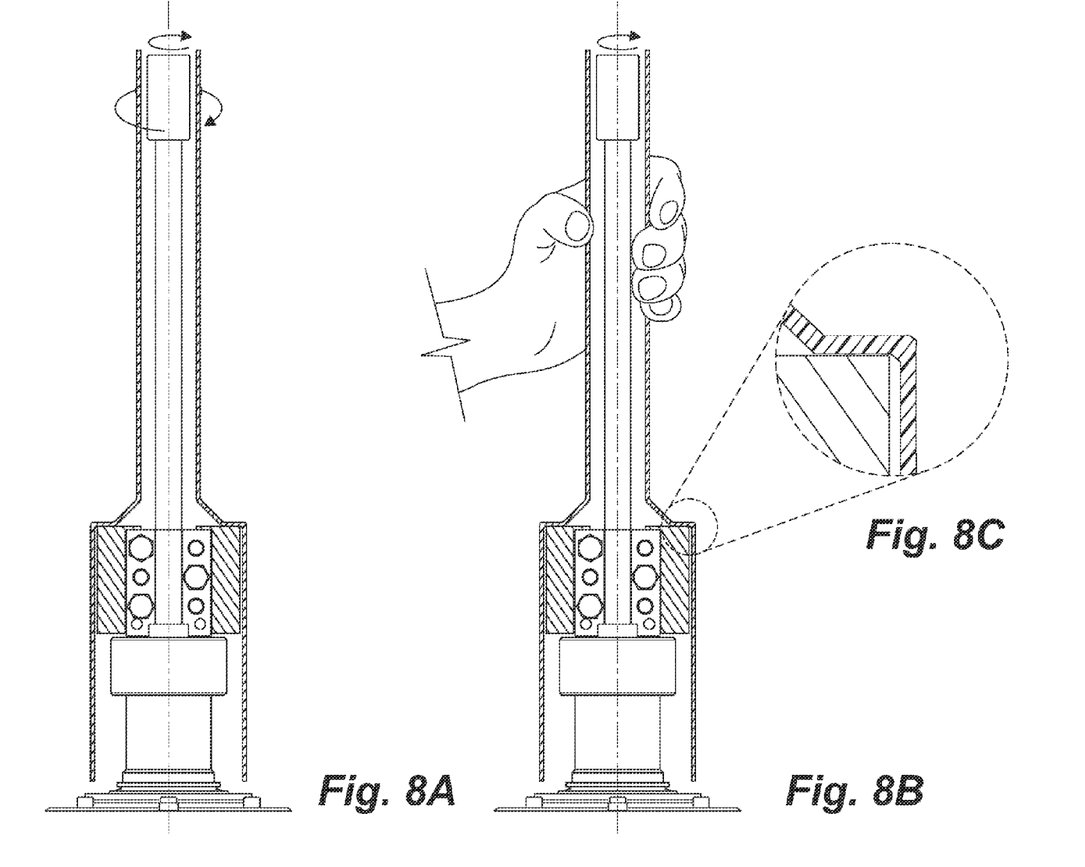
FIG. 8B is a detailed cross-sectional view of the safety guard according to FIG. 8A illustrating deceleration and cessation of rotation of the safety guard and continued rotation of the driven rotatable member when the safety guard is restrained.
FIG. 8C is a detailed cross-sectional view of according to a portion of FIG. 8B illustrating manufacture of the safety guard from plastic or PTFE.

According to various embodiments described herein, and shown in FIGS. 8A and 8B, when the safety guard 10 is in normal operation, that is during normal operation where the guard 10 is not engaged, encumbered or otherwise restrained from rotation, the guard 10 is free to co-rotate with the driven member 12 (FIG. 8A). However, when restrained, such as being grabbed or contacted in any manner by personnel, other apparatus or the like, the guard 10 decelerates to a stop, halting or arresting rotation of the guard 10 while rotation of the driven member 12 continues therein (FIG. 8B). The guard 10 is generally lightweight and has a low moment of inertia such that when restrained the guard 10 stops quickly, restrained from rotation despite continued rotation of the driven member 12. Thus, entanglement with the driven member 12 is prevented.

In embodiments, the rotatable member 12 is a rod assembly, being either a coiled rod or a polished rod assembly. The rod assembly 12 typically comprises a main driven shaft 18, a polished or coiled rod 20 and couplings 22 affixed thereto, and a rod clamp 24 which connects and supports the driven, rotatable rod 20 to the main shaft 18, or the like. The rod assembly 12 extends upwardly from the drive head 14, typically from a housing 25, such as a gear box or stuffing box. A drive 26 is operatively connected to at least the main shaft 18 for driving a rod 20, a rod string and downhole pump connected thereto (not shown). The drive 26 may also extend upwardly from the gear box 14.

While those of skill in the art will understand that the rotatable member 12 can be any driven member, including a shaft, a coiled rod assembly or a polished rod assembly, for ease of description, embodiments herein are described in the context of a polished rod assembly.

A rotor and polished rod of a conventional progressive cavity pump (PC pump) are typically rotated at less than about 700 rpm. The rotational speeds are even slower as the viscosity of the fluid to be pumped increases. Rotational speeds of less than 100 rpm are not typically used. As one of skill in the art can see, when the guard 10 is restrained and decelerated to a stop, the differential rotational speeds are not high.

The antifriction interface F acts to minimizes friction between the guard 10 and the polished rod assembly 12.

Figure 1A:
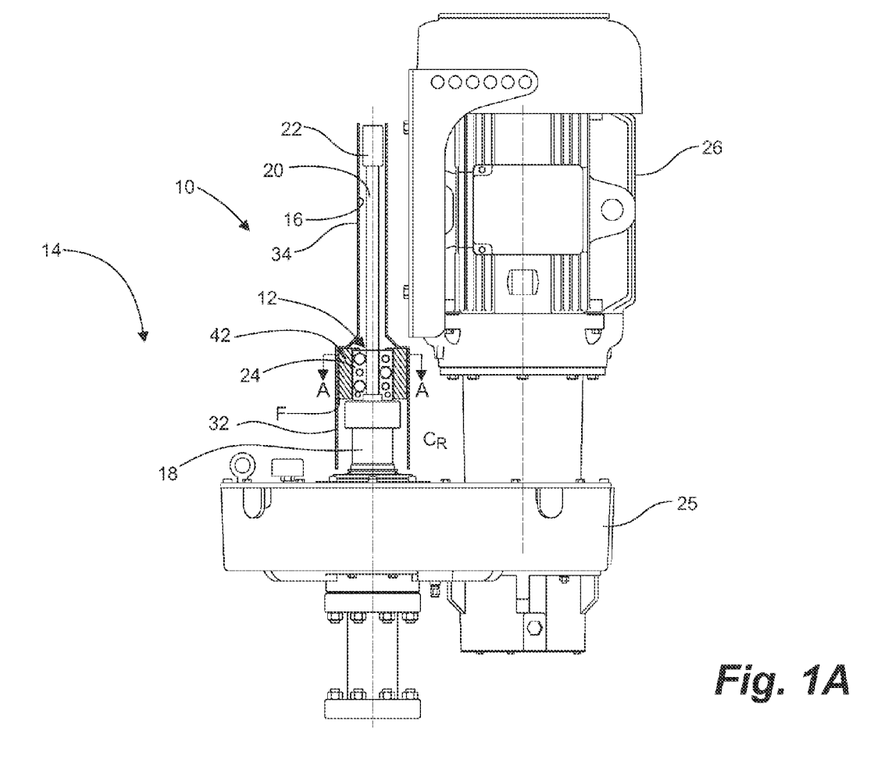
FIG. 1A is a partial cross-sectional view of a safety guard according to one embodiment, the safety guard being mounted to a polish rod assembly for co-rotation therewith and shown in relation to a gearbox and motor of a drive head.
Figure 1B:
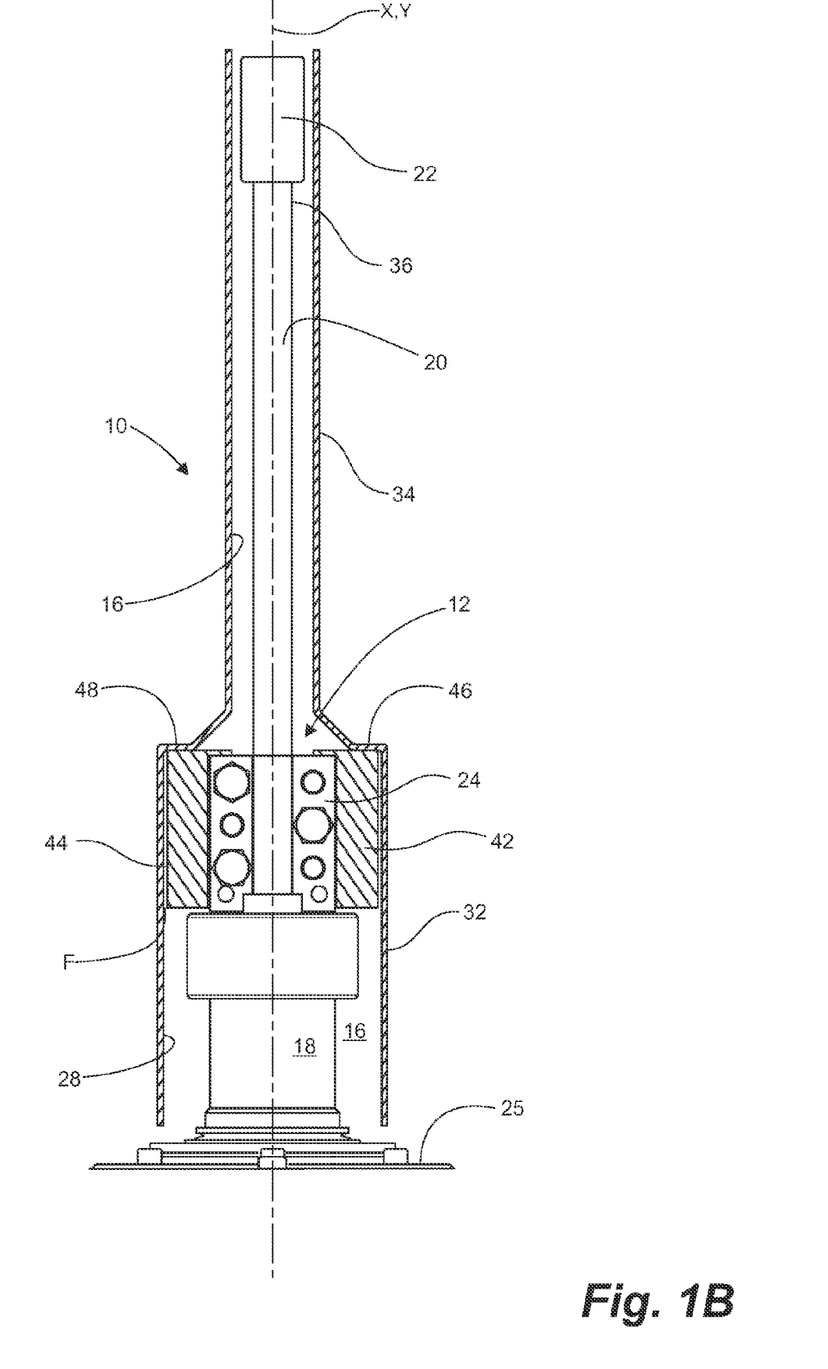
FIG. 1B is a detailed cross-sectional view of the safety guard according to FIG. 1A.
Figures 1C, 1D:
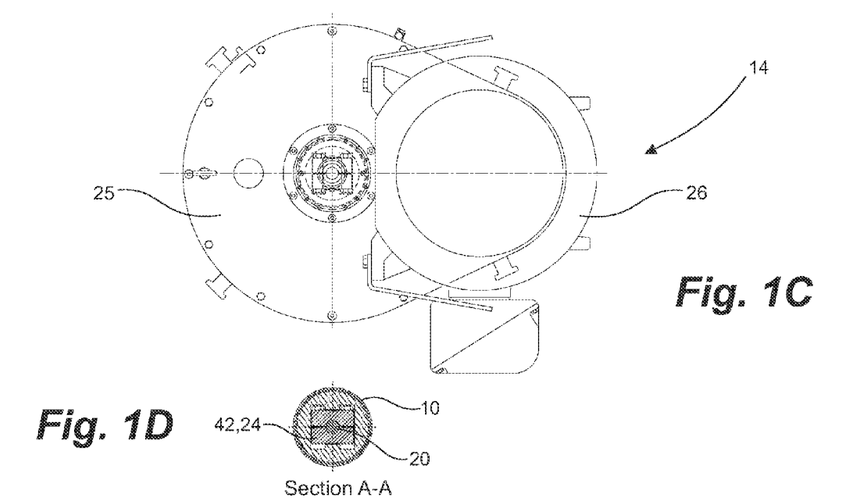
FIG. 1C is a plan view according to FIG. 1A.
FIG. 1D is a cross-sectional view of the guard and rod assembly along section lines A-A of FIG. 1A.
Figure 3A:
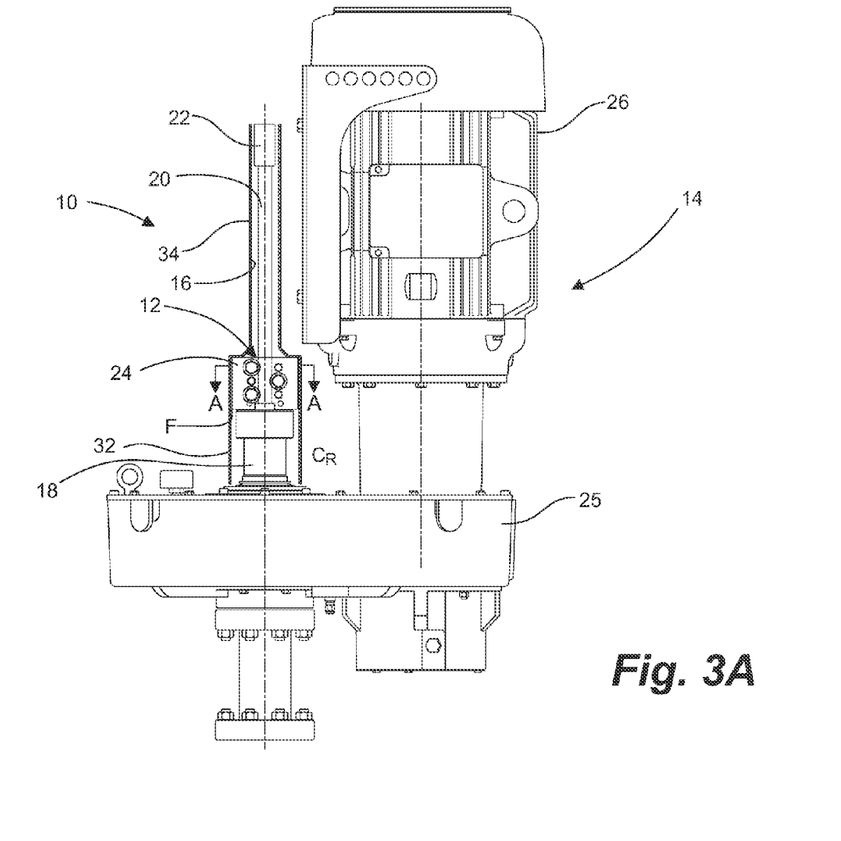
FIG. 3A is a partial cross-sectional view of a safety guard according to another embodiment.
Figure 3B:
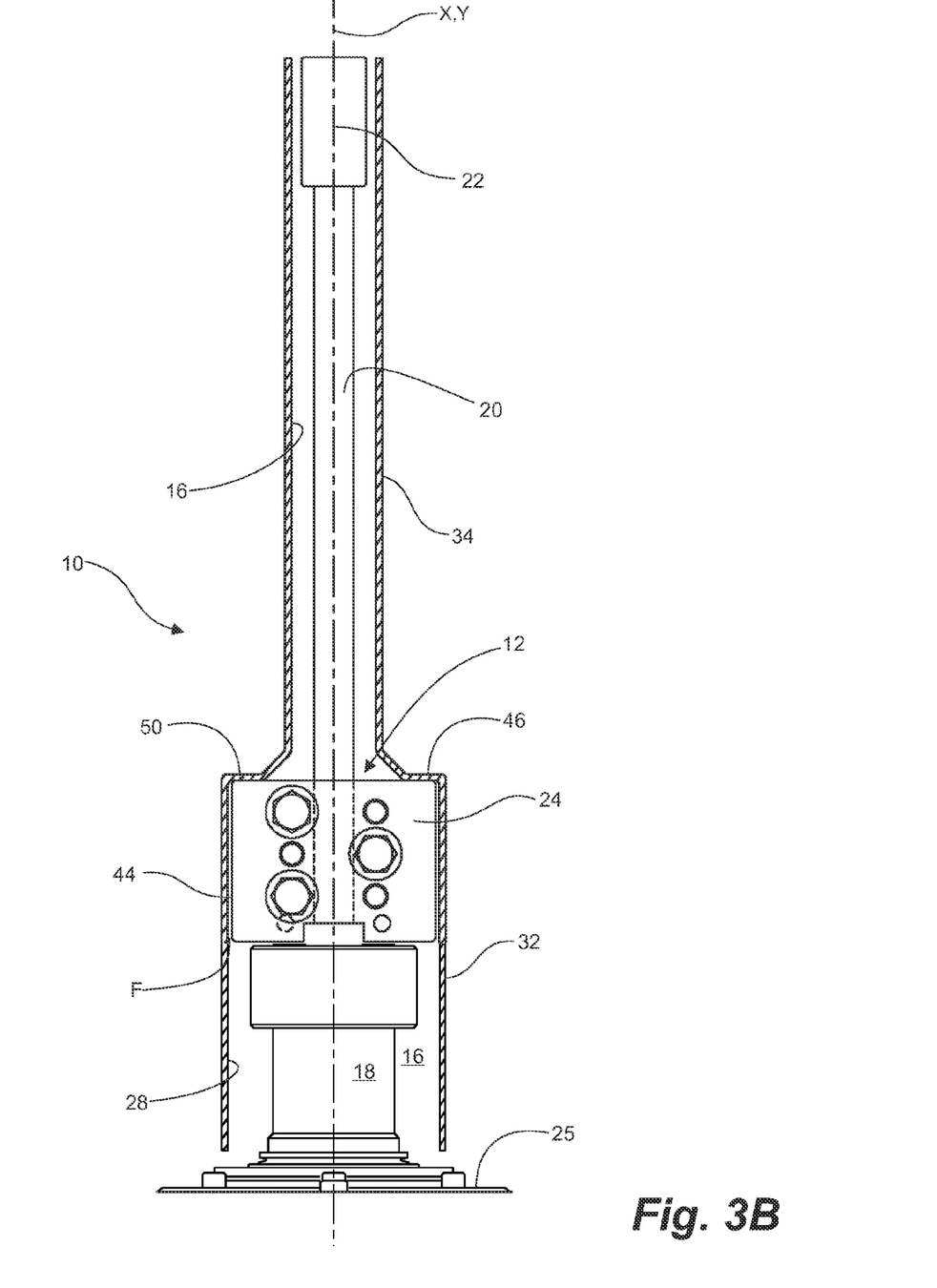
FIG. 3B is a detailed cross-sectional view of the safety guard according to FIG. 3A.
Figures 3C, 3D:
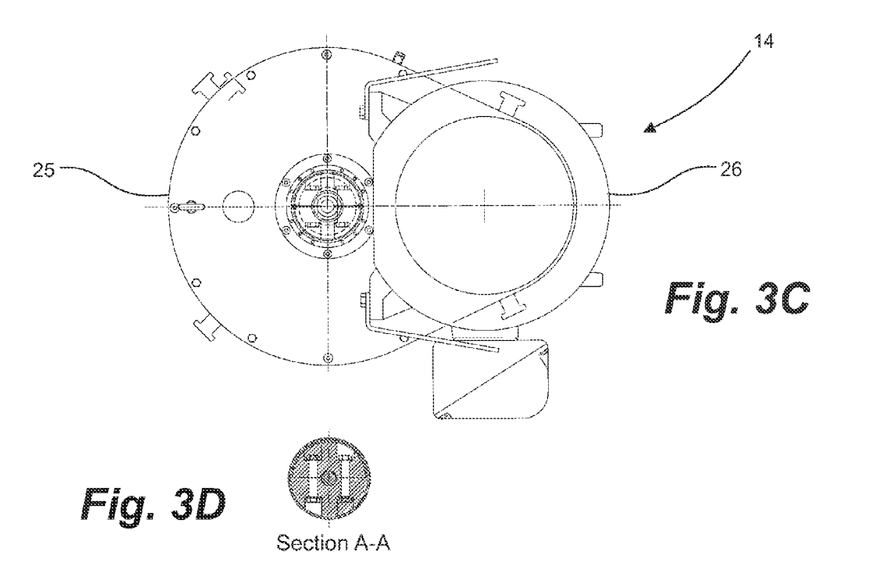
FIG. 3C is a plan view according to FIG. 3A.
FIG. 3D is a cross-sectional view of the guard and rod assembly along section lines A-A of FIG. 3A.

In embodiments, best seen in FIGS. 1B, 3B and 8C, a material of manufacture of the guard 10 or at least an inner surface 28 thereof, forms the anti-friction interface F. The use of various plastic materials in the manufacture of the guard 10, such as polytetrafluoroethylene (PTFE), reduce the coefficient of friction.

In embodiments best seen in FIGS. 2, 4B, 5B and 6B, the anti-friction interface F may comprise intermediate bushing or bearings 40 operatively supported in the annulus 16, alone or in combination with friction-reducing plastic material, to reduce the degree of friction produced.

Where the drive 26 is adjacent to and extends upwardly from the gear box 14, typically along an axis parallel to that of the rod assembly 12, the drive 26 may encroach upon a clearance C about the rod assembly 12, and the guard 10 which is operatively connected thereto, as described below. In embodiments, the guard 10 is profiled for conforming to and fitting concentrically over the polished rod assembly 12 for minimizing a diameter of at least a portion of the guard 10 so as to be accommodated and rotatable within the encroached clearance C. Thus, interference between the guard 10 and the adjacent drive 26 is minimized.

In embodiments shown in FIGS. 1A to 6D, the profiled guard 10 comprises a larger diameter, lower portion 32, for fitting over the main shaft 18 and the polished rod clamp 24, and a smaller diameter, upper portion 34, for fitting over the polished rod 20. The upper portion 34 extends upwardly from the polished rod clamp 24, sized to accommodate the smaller diameter polish rod 20. The upper portion 34 also extends about a polished rod coupling 22 connected to a top end 36 of the polished rod 20. A radially extending shoulder 46 connects the upper and lower portions 34,32.

Conveniently, there is typically a generous radial clearance or recess $C_R$ formed about the polish rod clamp 24, between the gearbox 14 and the parallel and adjacent drive 26, mounted thereabove. Advantageously, the larger diameter, lower portion 32 typically extends into the typical recess $C_R$ existing between the gearbox 14 and the drive 26.

As shown in FIGS. 1A-1B and 3A-3B, wherein the anti-friction interface F generally results from the material of manufacture of the guard 10 or the inner surface 28 thereof, the guard 10 is rotationally supported directly on the polished rod assembly 12 for normal co-rotation therewith and differential rotation when restrained. An axis of rotation X of the guard 10 is concentric with an axis of rotation Y of the polished rod assembly 12. The guard 10 is supported to minimize angular misalignment, wobbling or tipping. In embodiments, the guard 10 is supported at the polished rod clamp 24, to both accept axial loading, such as the weight of the guard 10, and radial loading applied thereto, while permitting relative rotation of a restrained guard 10 about the rotating polish rod clamp 24.

Optionally, as shown in FIGS. 2, 4A-4B, 5A-5B and 6A-6B, bushings or bearings 40 or a combination thereof, referred to herein collectively as bearings, are operatively connected in the annulus 16 between the guide 10 and the polished rod assembly 12 to accept radial and axial loads imposed therebetween.

Having reference again to FIGS. 1A-1D and in one embodiment of a system comprising the guard 10 and the rod assembly 12, the polished rod clamp 24 is typically square or rectangular in cross-section. To accommodate various rod clamps 24, a generally circular adapter sleeve 42, such as a cast sleeve, is fit about the non-circular rod clamp 24 for forming an outer cylindrical surface 44 thereabout. The sleeve 42 has an inner profile which corresponds to the non-circular cross-section of the rod clamp 24. The outer cylindrical surface 44 of the sleeve 42 forms a bearing surface or supports a bearing surface thereon, being the anti-friction interface F, for accepting at least the radial loads imparted thereto. The radially extending shoulder 46 formed between the guard's smaller diameter upper portion 34 and the larger diameter lower portion 32 engages a top 48 of at least the sleeve 42 which acts to accept axial loading thereon.

Figure 2:
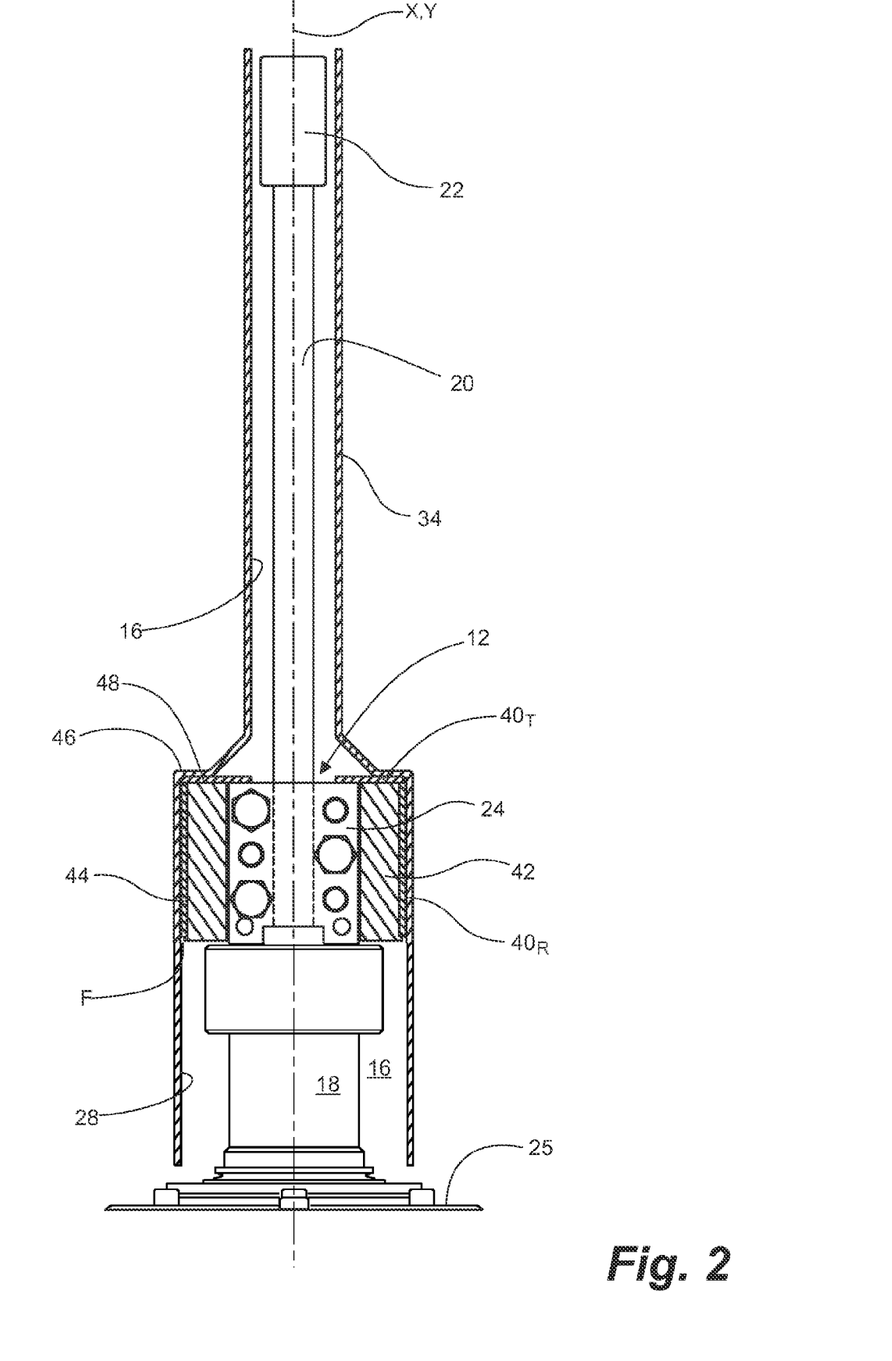
FIG. 2 is a detailed cross-sectional view of a safety guard according to another embodiment.
Figure 7A:
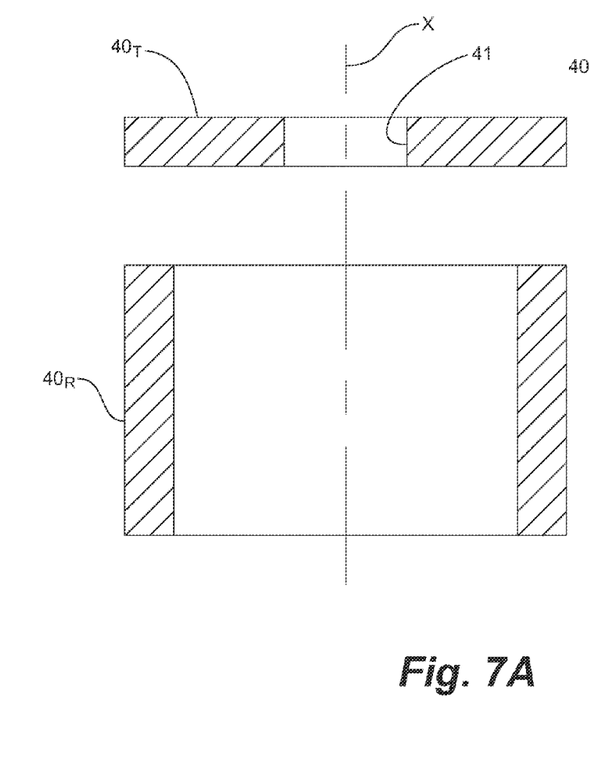
FIG. 7A is a cross-sectional view of a thrust bearing and a radial bearing used in embodiments disclosed herein.

Having reference to FIGS. 2 and 7A, a radial bearing $40_R$ is supported in the annulus 16, mounted between the cylindrical outer surface 44 of the cast sleeve 42 and the guard 10. The bearing $40_R$ forms the anti-friction interface F and accepts radial loading therebetween. A thrust bearing $40_T$ supported in the annulus 16 between the top 48 of the sleeve 42 and the guard's radially extending shoulder 46 supports axial loading thereon. Best seen in FIG. 7A, the radial bearing $40_R$ is generally a tubular bearing or bushing and the thrust bearing $40_T$ is a washer having a rod passage 41 at the rotational axis X.

Having reference to FIGS. 3A-3D, the polished rod clamp 24 is a generally cylindrical clamp having the outer cylindrical surface 44 thereon which acts to accept radial loading between the guard 10 and the polished rod clamp 24. The cylindrical surface 44 engages the larger diameter, lower portion 32 of the guard 10 for accepting the radial loading. The radially extending shoulder 46 formed between the smaller diameter upper portion 34 and the larger diameter lower portion 32 of the guard 10 engages a top 50 of the cylindrical clamp 24 which acts to accept axial loading thereon.

As shown in FIGS. 4A-4D, in the embodiment of FIGS. 3A-3D, a thrust bearing $40_T$ is supported between the top 50 of the cylindrical polished rod clamp 24 and the shoulder 46 of the guard 10 for forming the anti-friction interface F. A radial bearing $40_R$ is supported between the cylindrical surface 44 of the polished rod clamp 24 and the lower portion 32 of the guard 10 for supporting radial loading and forming the anti-friction interface F.

In embodiments, the guard 10 is generally installed by slipping the guard 10 axially over the entirety of the polished rod assembly 12. The guard 10 is supported on the rod clamp 24 above the drive head 14 for rotation thereabove when unrestrained.

Figure 5A:
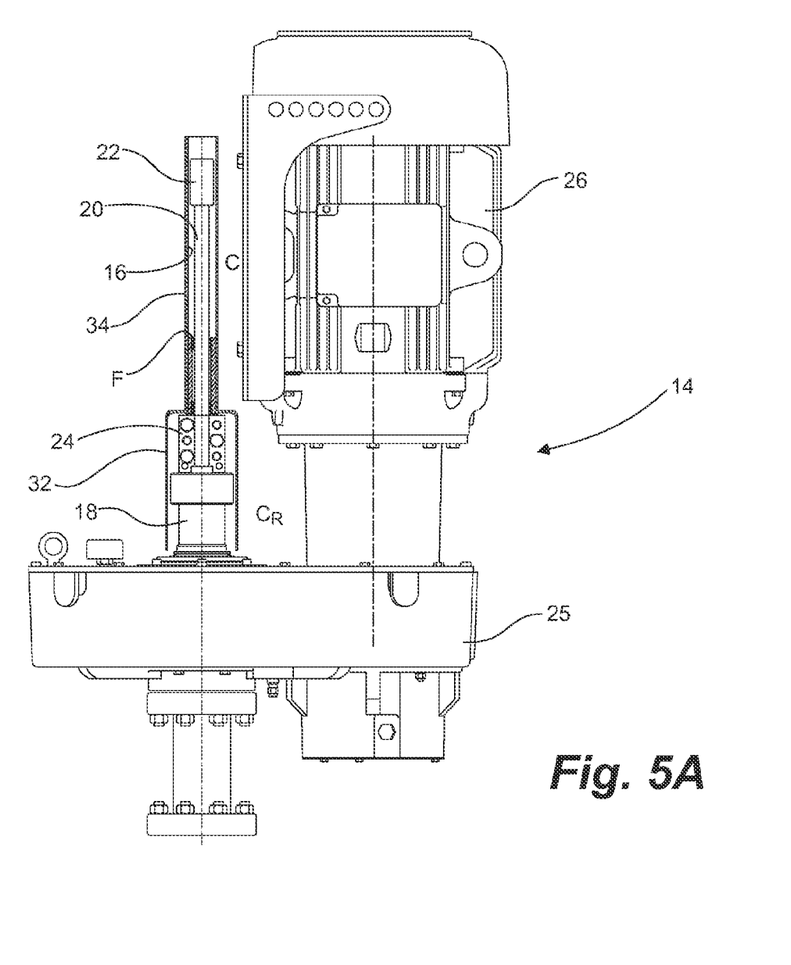
FIG. 5A is a partial cross-sectional view of a safety guard according to another embodiment.
Figure 5B:
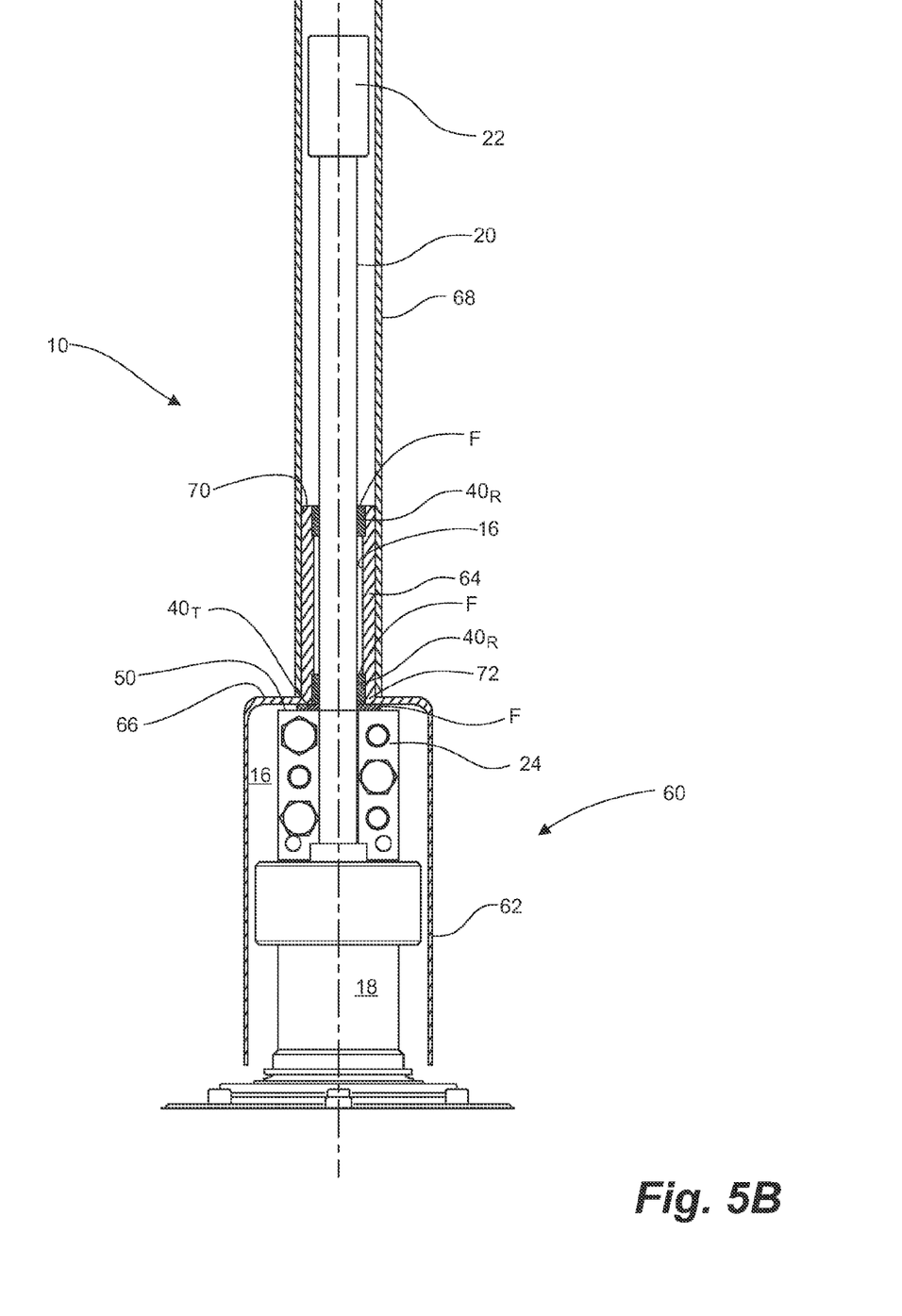
FIG. 5B is a detailed cross-sectional view of a two-part safety guard according to FIG. 5A.
Figure 5C:
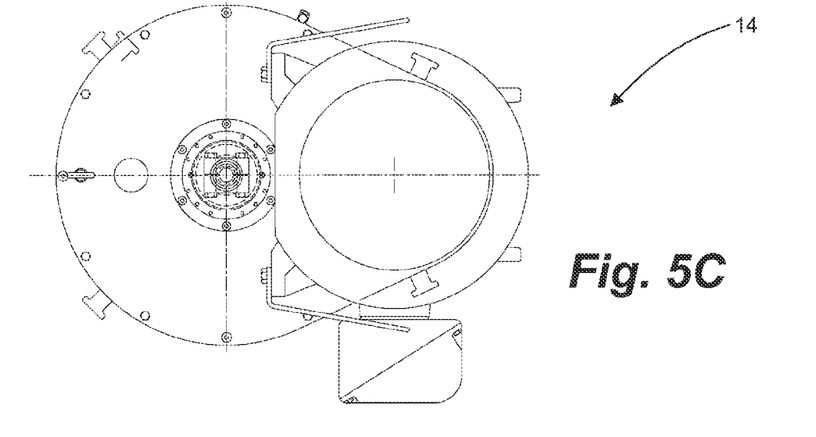
FIG. 5C is a plan view according to FIG. 5A.

For ease of manufacture, installation and retrofit, as shown in FIGS. 5A-5C, the guard 10 can be manufactured as a two-piece guard 10. In this case, a lower tubular member 60 is a separate, profiled tubular which comprises a lower tubular portion 62 having a diameter for fitting over at least the rod clamp 24 and the main shaft 18. A relatively short, upper tubular extension 64 extends upwardly from the lower portion 62 and has a smaller diameter for fitting over a portion of the rod 20. A radially extending shoulder 66 is formed between the lower portion and upper extension 62,64. An upper tubular member 68 has a diameter sized so as to fit over the lower member's tubular extension 64 and about the remainder of the rod 20. The upper tubular member 68 is press-fit or friction-fit over the lower member's upper extension 64 for retaining the upper tubular member 68 on the lower tubular member 60.

The anti-friction interface F is formed by radial bearings $40_R$ in the portion of the annulus 16 between the tubular extension 64 and the rod 20 and thrust bearings $40_T$ in the portion of the annulus 16 between the lower member 62 and the rod clamp 24. Two radial bearings $40_R$ may be used, one adjacent a top end 70 of the tubular extension 64 and one adjacent a bottom end 72 thereof. Thrust bearings $40_T$ are supported between the shoulder 66 and the top 50 of the polished rod clamp 24.

Figures 6A, 6D:
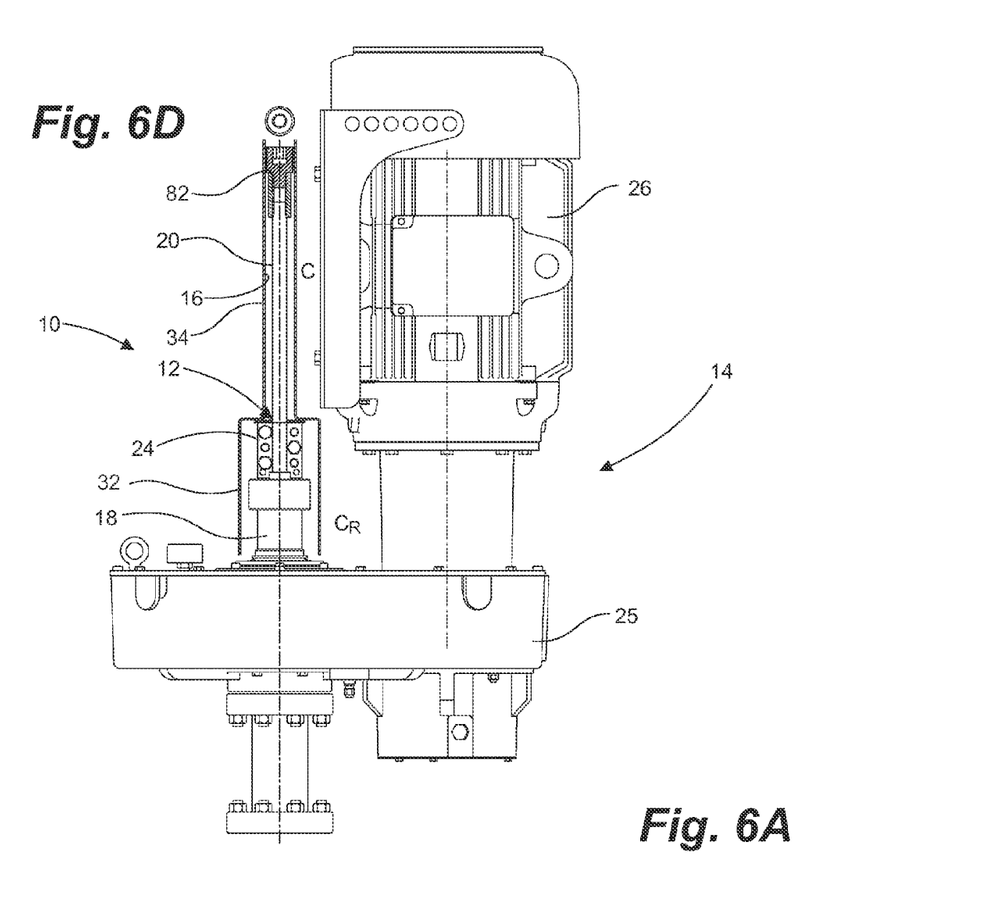
FIG. 6A is a partial cross-sectional view of a safety guard according to another embodiment.
FIG. 6D is a detailed cross-sectional view according to FIG. 6A, a motor and gearbox having been removed for enlarging the view of the safety guard for clarity.
Figure 6B:
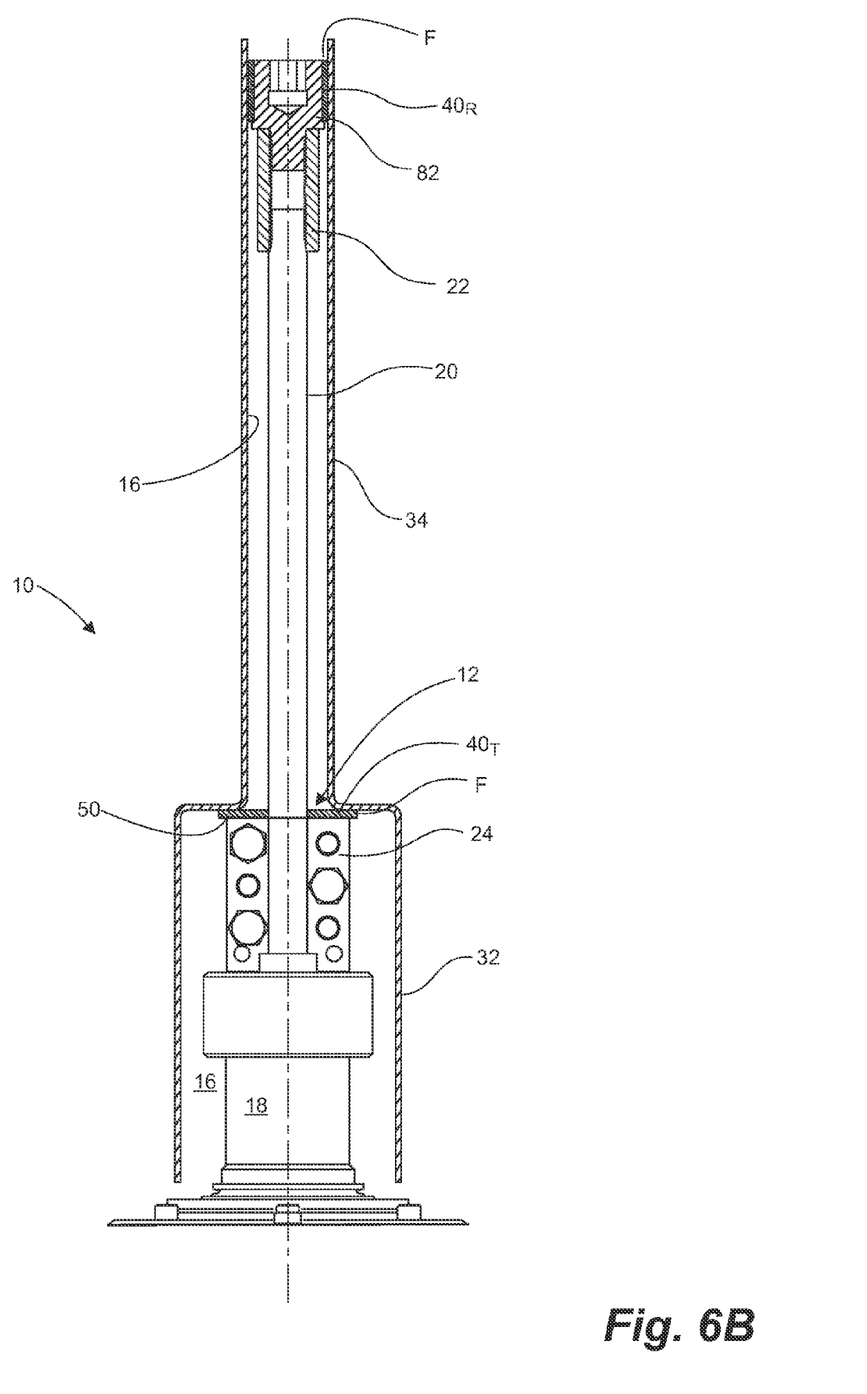
FIG. 6B is a plan view according to FIG. 6A.
Figure 6C:
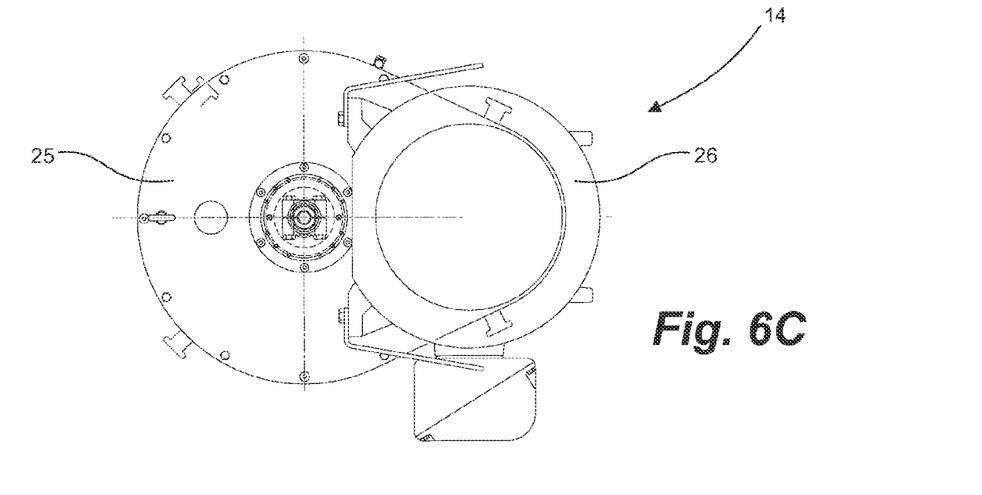
FIG. 6C is a cross-sectional view along section lines A-A of FIG. 6A.

Having reference to FIGS. 6A-6D, and best seen in FIG. 6B, in another embodiment, the anti-friction interface F is formed by a radial bearing $40_R$ supported in the annulus 16 between the upper portion 34 of the guard 10 and the top end 36 of the rod 20, such as about a bearing adapter 82 fit to a top 84 of the polished rod coupling 22 at the top end 36 of the polished rod 20. The thrust bearing $40_T$ is supported on the top 50 of the rod clamp 24, which may be a square or rectangular clamp 24.

Figures 7B, 7C:
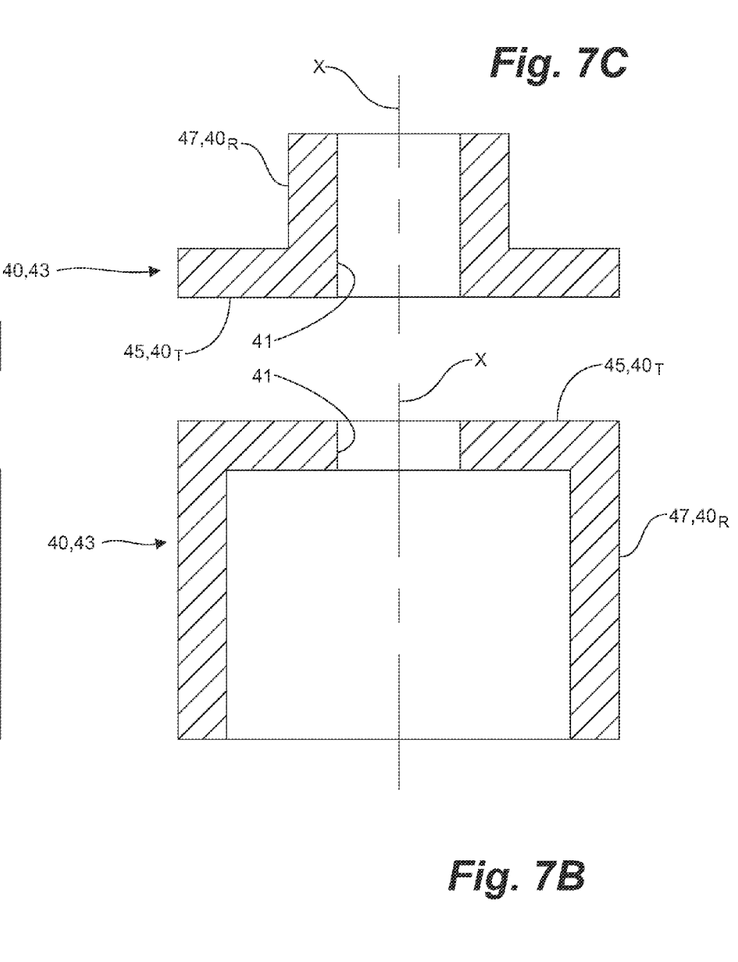
FIG. 7B is a cross sectional view of an integrated bearing formed from a radial bearing and a thrust bearing, such as for use in the embodiments shown in FIGS. 2 and 4B.
FIG. 7C is a cross-sectional view of another integrated bearing for use in the embodiment shown in FIG. 5B.

Having reference again to FIGS. 2, 4B, 5B and to FIGS. 7B-7C, in another embodiment, the radial and thrust bearings $40_R, 40_T$ can be integrated into a single bearing 40. The single bearing 40 can be used between the shoulder 46,66 of the guard 10, and the rod clamp 24 or rod 20, in place of separate radial and thrust bearings $40_R, 40_T$.

Best seen in FIGS. 7B and 7C, the integrated bearing 40 is a cap 43 having the rod passage 41 at the rotational axis X. The transverse portion 45 of the cap 43 forms the thrust bearing $40_T$. The cap 43 can be formed of low friction material.

Figure 4A:
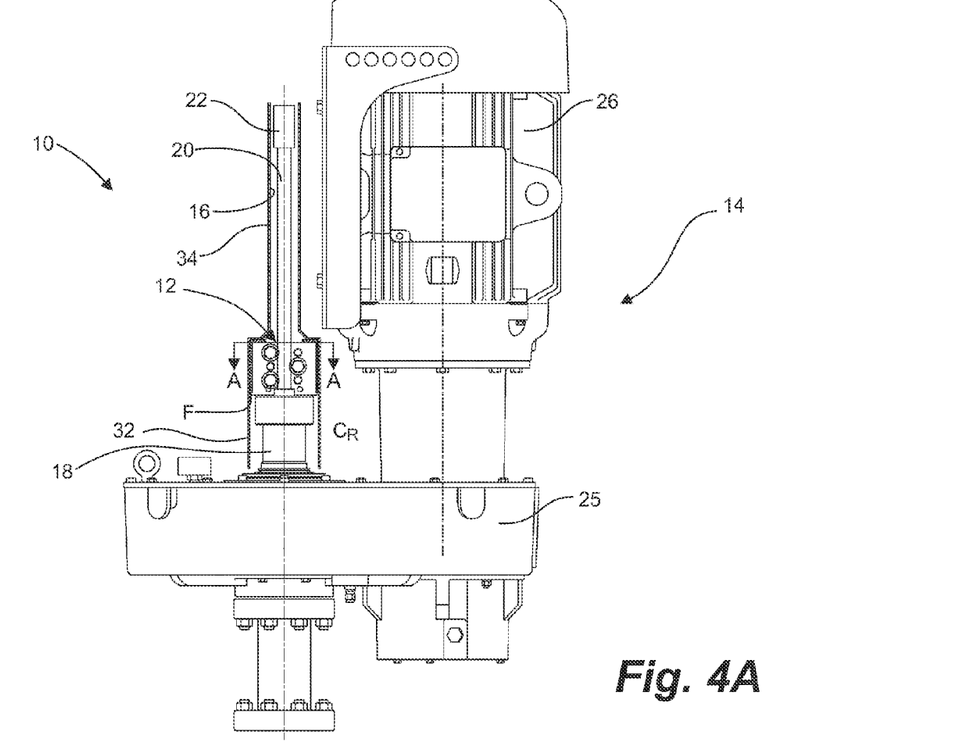
FIG. 4A is a partial cross-sectional view of a safety guard according to another embodiment.
Figure 4B:
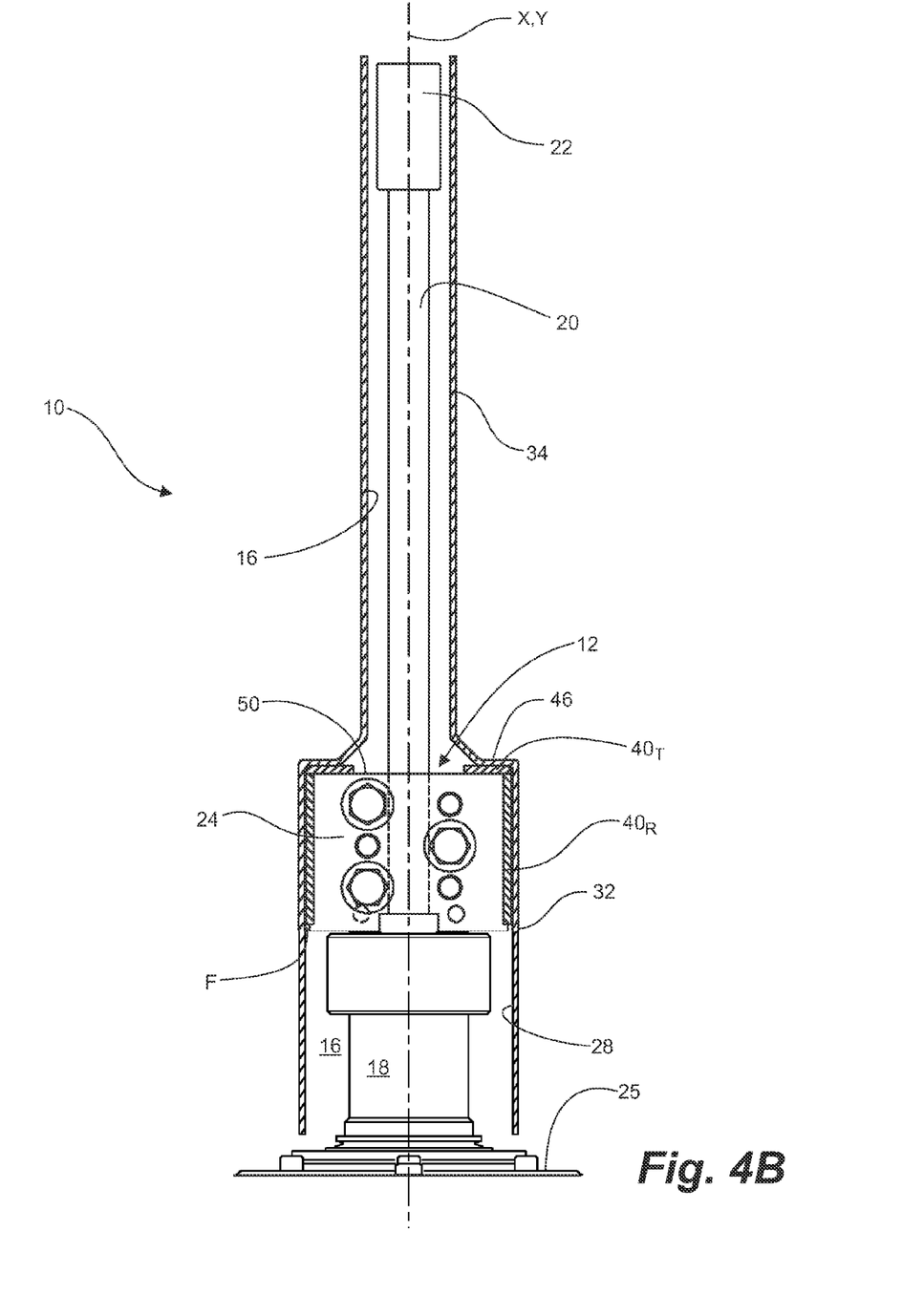
FIG. 4B is a detailed cross-sectional view of the safety guard according to FIG. 4A.
Figure 4C:
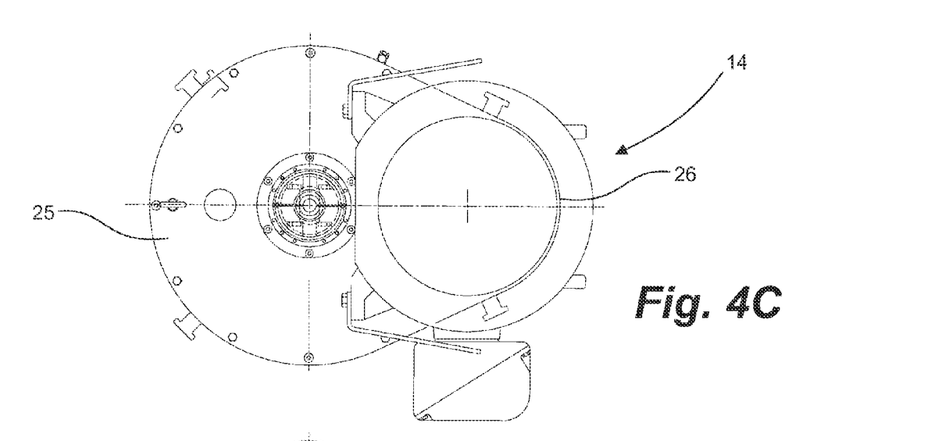
FIG. 4C is a plan view according to FIG. 4A.
Figure 4D:
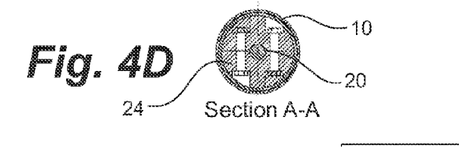
FIG. 4D is a cross-sectional view of the guard and rod assembly along section lines A-A of FIG. 4A.

As shown in FIG. 7B, for use in the embodiments of FIGS. 2 and 4B, the tubular portion 47 extends downwardly and is sized to accommodate the rod clamp 24. The tubular portion 47 forms the radial bearing $40_R$.

As shown in FIG. 7C, for use in the embodiment of FIG. 5B, the tubular portion 47 extends upwardly and is sized to accommodate the rod 20.

As one of skill in the art would appreciate, bearings or bushing as described herein can be supported between the guard 10 and the polished rod assembly 12 in a number of ways, including but not limited to being mounted on one or the other of the polished rod assembly 12 or to the guard 10, without departing from the overall concept of the invention.

In embodiments, the guard 10 may be restrained and non-rotational during normal operation. The anti-friction interface F in the annulus 16 between the normally restrained guard 10 and the driven member 12 aids in rotation of the driven member 12 therein. Further, as in the various embodiments described above wherein the guard 10 has the larger diameter lower portion 32 and the upper smaller diameter portion 34, the shape of the guard 10 also acts to minimize the size of the drive head 14.

The embodiments in which an exclusive property or privilege is claimed are defined as follows:

1. A system for preventing entanglement by contact with a rotating rod assembly for driving a downhole pump, the system comprising:
    a drive head having
        a housing from which the rotating rod assembly extends, the rod assembly comprising a rotating rod and a rod clamp for operatively connecting the rotating rod to a main driven shaft extending upwardly from the housing and being rotatable therewith; and
        a tubular guard positioned concentrically about the driven member, forming an annulus therebetween, the guard having a moment of inertia; and
        an anti-friction interface within the annulus for enabling differential rotation between the guard and the driven member,
        when, during normal operation, the safety guard is unrestrained, the guard is free to co-rotate with the driven member; and
        when restrained by contact therewith, the moment of inertia enables rotation of the guard to cease rotation while the driven member continues to rotate therein.

2. The system of claim 1 wherein at least a material of manufacture of the guard forms the anti-friction surface.

3. The system of claim 2 wherein the material of manufacture is a plastic.

4. The system of claim 3 wherein the plastic is polytetrafluoroethylene.

5. The system of claim 1 wherein the anti-friction interface further comprises bushing or bearings or a combination thereof.

6. The system of claim 1 further comprising a drive operatively connected to the main shaft for driving the pump, the drive extending upwardly from the housing adjacent to the rod assembly; the drive encroaching on a clearance about the guard, the guard further comprising:
    a lower portion sized to fit over the main shaft and the rod clamp;
    an upper portion having a smaller diameter than that of the lower portion for fitting over the rod extending therefrom; and
    a radial shoulder extending therebetween, the shoulder axially engaging the rod clamp for supporting the guard thereon.

7. The system of claim 1 further comprising a drive operatively connected to the main shaft for driving the pump, the drive extending upwardly from the housing adjacent to the rod assembly; the drive encroaching on a clearance about the guard, the guard further comprising:
    a lower tubular member having:
        a lower tubular portion having a diameter for fitting over at least the rod clamp and main shaft,
        an upper tubular extension having a diameter for extending axially over at least a portion of the rod; and
        a radially extending shoulder formed therebetween; and
    an upper tubular member sized to fit over the upper tubular extension and the rod.

8. The system of claim 1 wherein the rod clamp further comprises an outer cylindrical surface for supporting the anti-friction interface thereon.

9. The system of claim 8 further comprising at least radial bearings mounted about the outer cylindrical surface for forming the anti-friction interface.

10. The system of claim 8 further comprising at least thrust bearings mounted in the annulus between a top of the rod clamp and the radial shoulder for accepting axial loading thereon.

11. The system of claim 1 wherein the rod clamp has a non-cylindrical cross-section, further comprising:
    an adapter sleeve having an inner profile corresponding to the cross-section of the rod clamp and an outer cylindrical surface for supporting the anti-friction interface thereon.

* * * * *